(12) United States Patent
Rheaume et al.

(10) Patent No.: US 10,307,708 B2
(45) Date of Patent: Jun. 4, 2019

(54) FUEL TANK SYSTEM AND METHOD

(71) Applicant: HAMILTON SUNDSTRAND CORPORATION, Windsor Locks, CT (US)

(72) Inventors: Jonathan Rheaume, West Hartford, CT (US); Haralambos Cordatos, Colchester, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/192,692

(22) Filed: Jun. 24, 2016

(65) Prior Publication Data
US 2017/0368496 A1    Dec. 28, 2017

(51) Int. Cl.
*B01D 53/22* (2006.01)
*B01D 17/02* (2006.01)
(Continued)

(52) U.S. Cl.
CPC .............. *B01D 53/22* (2013.01); *B01D 17/02* (2013.01); *B64D 37/005* (2013.01); *B64D 37/02* (2013.01);
(Continued)

(58) Field of Classification Search
CPC .............. B01D 2257/702; B01D 53/22; B01D 2053/221; B01D 17/02; B64D 37/32; B64D 37/02; B67D 7/0476
See application file for complete search history.

(56) References Cited

U.S. PATENT DOCUMENTS 2,845,383 A * 7/1958 Bowles, Jr. ............ B01D 53/34
                                                                 208/152
3,590,559 A    7/1971 Bragg et al.
(Continued)

FOREIGN PATENT DOCUMENTS

DE            4225170 A1    2/1994
DE      102009040013 A1    3/2011
(Continued)

OTHER PUBLICATIONS

Cordatos, H., "Air Separation System for Fuel Stabilization," U.S. Appl. No. 15/338,578, filed Oct. 31, 2016, pp. 1-19.
(Continued)

*Primary Examiner* — Anthony R Shumate
(74) *Attorney, Agent, or Firm* — Cantor Colburn LLP

(57) ABSTRACT

A fuel tank system is disclosed that includes a fuel tank and a first fluid flow path between a gas space in the fuel tank and outside of the fuel system. A gas separation membrane is disposed with a first side in communication with the first fluid flow path and a second side in communication with a second fluid flow path. A fluid control device is in communication with the second fluid flow path and is configured to provide fluid flow from the second fluid flow path to a liquid space in the fuel tank or to outside of the fuel system. A prime mover is disposed in communication with the second fluid flow path, and is configured to move fluid on the second fluid flow path from the second side of the separation membrane to the fuel tank liquid space or to outside of the fuel system.

18 Claims, 6 Drawing Sheets

(51) Int. Cl.
*B64D 37/02* (2006.01)
*B64D 37/32* (2006.01)
*B64D 37/00* (2006.01)
*B64F 1/28* (2006.01)

(52) U.S. Cl.
CPC .............. *B64D 37/32* (2013.01); *B64F 1/28* (2013.01); *B01D 2053/221* (2013.01); *B01D 2259/4516* (2013.01); *Y02T 50/82* (2013.01)

(56) References Cited

U.S. PATENT DOCUMENTS

| | | | |
|---|---|---|---|
| 3,672,180 | A | 6/1972 | Davis |
| 3,710,549 | A | 1/1973 | Nichols et al. |
| 3,732,668 | A | 5/1973 | Nichols |
| 3,788,039 | A | 1/1974 | Bragg |
| 3,847,298 | A | 11/1974 | Hamilton |
| 4,681,602 | A | 7/1987 | Glenn et al. |
| 5,220,799 | A * | 6/1993 | Lievens ............. B01D 5/0081 220/88.3 |
| 5,255,735 | A | 10/1993 | Raghava et al. |
| 5,782,188 | A * | 7/1998 | Evans ................. C10B 1/10 110/210 |
| 5,843,212 | A | 12/1998 | Nanaji |
| 6,012,533 | A | 1/2000 | Cramer |
| 6,315,815 | B1 | 11/2001 | Spadaccini et al. |
| 6,432,169 | B1 * | 8/2002 | Kluwe ............... B01D 53/261 95/117 |
| 6,440,317 | B1 | 8/2002 | Koethe |
| 6,578,639 | B1 | 6/2003 | Osime et al. |
| 6,705,092 | B1 | 3/2004 | Zhou et al. |
| 6,729,359 | B2 | 5/2004 | Jones |
| 6,840,292 | B2 | 1/2005 | Hart et al. |
| 7,204,868 | B2 | 4/2007 | Snow, Jr. |
| 7,459,081 | B2 | 12/2008 | Koenig et al. |
| 7,517,388 | B2 | 4/2009 | Jensvold |
| 7,595,019 | B2 | 9/2009 | Cutler et al. |
| 7,628,965 | B2 | 12/2009 | Johnson |
| 7,694,916 | B2 | 4/2010 | Limaye et al. |
| 7,896,292 | B2 | 3/2011 | Limaye |
| 7,905,259 | B2 | 3/2011 | Johnson |
| 8,192,532 | B1 | 6/2012 | Gupta |
| 8,245,978 | B1 | 8/2012 | Beers et al. |
| 8,388,740 | B2 | 3/2013 | Sohn et al. |
| 8,499,567 | B2 | 8/2013 | Hagh |
| 8,602,362 | B2 | 12/2013 | Buchwald |
| 8,763,712 | B2 | 7/2014 | Kotliar |
| 8,801,831 | B1 | 8/2014 | Snow, Jr. et al. |
| 8,813,860 | B2 | 8/2014 | Bleil et al. |
| 8,882,886 | B2 | 11/2014 | Evosevich et al. |
| 8,904,669 | B2 | 12/2014 | Tichborne et al. |
| 8,925,865 | B2 | 1/2015 | Stolte et al. |
| 8,950,703 | B2 | 2/2015 | Bayliss et al. |
| 9,016,078 | B2 | 4/2015 | Gupta |
| 9,096,326 | B2 | 8/2015 | Dooley et al. |
| 9,114,886 | B2 | 8/2015 | Gupta |
| 9,118,054 | B2 | 8/2015 | Gummalla et al. |
| 9,120,571 | B2 | 9/2015 | Kshirsagar et al. |
| 9,174,740 | B2 | 11/2015 | Stolte et al. |
| 9,186,622 | B1 | 11/2015 | Ranjan et al. |
| 9,216,931 | B1 * | 12/2015 | Su ..................... C07C 7/09 |
| 9,340,297 | B2 | 5/2016 | Cao |
| 9,511,874 | B2 * | 12/2016 | Tiger ................. B64D 37/32 |
| 9,687,773 | B2 | 6/2017 | Johnson et al. |
| 2002/0152889 | A1 * | 10/2002 | Baker ................ B01D 53/228 95/45 |
| 2002/0160240 | A1 * | 10/2002 | Matsui .............. H01M 8/04029 429/414 |
| 2003/0196645 | A1 * | 10/2003 | Kojima .............. F02M 25/089 123/520 |
| 2004/0226438 | A1 | 11/2004 | Jones |
| 2005/0048334 | A1 | 3/2005 | Sridhar et al. |
| 2005/0247197 | A1 | 11/2005 | Snow, Jr. |
| 2006/0011063 | A1 | 1/2006 | Zhou |
| 2006/0113248 | A1 | 6/2006 | Koenig et al. |
| 2007/0039464 | A1 | 2/2007 | Vanderhoof et al. |
| 2008/0128048 | A1 | 6/2008 | Johnson et al. |
| 2008/0176174 | A1 | 7/2008 | White et al. |
| 2009/0227195 | A1 | 9/2009 | Buelow et al. |
| 2009/0321090 | A1 | 12/2009 | Bleil et al. |
| 2009/0325014 | A1 | 12/2009 | Newkirk |
| 2010/0006048 | A1 | 1/2010 | Minty et al. |
| 2010/0107877 | A1 * | 5/2010 | Suzuki .................. B01D 53/22 96/6 |
| 2010/0155315 | A1 * | 6/2010 | Partridge ........... B01D 19/0031 210/149 |
| 2010/0252005 | A1 | 10/2010 | Kitamoto et al. |
| 2011/0003224 | A1 * | 1/2011 | Scheibert .......... H01M 8/04059 429/434 |
| 2011/0014536 | A1 | 1/2011 | Yoshida |
| 2011/0262309 | A1 | 10/2011 | Limaye |
| 2012/0035406 | A1 | 2/2012 | Lam et al. |
| 2012/0292058 | A1 | 11/2012 | Bleil et al. |
| 2012/0325811 | A1 | 12/2012 | Hagh et al. |
| 2013/0071594 | A1 * | 3/2013 | Bikson ................ F28D 15/00 428/36.9 |
| 2013/0098314 | A1 | 4/2013 | Imran et al. |
| 2013/0168111 | A1 | 7/2013 | Wong et al. |
| 2013/0214464 | A1 * | 8/2013 | Lancho Doncel ....... F16F 7/00 267/140.11 |
| 2013/0312743 | A1 | 11/2013 | Kshirsagar et al. |
| 2014/0150649 | A1 * | 6/2014 | Stolte ................ B64D 33/04 95/52 |
| 2014/0208943 | A1 | 7/2014 | Gupta |
| 2014/0251426 | A1 * | 9/2014 | Bando ................ C08K 3/346 136/256 |
| 2014/0252171 | A1 | 9/2014 | Dooley et al. |
| 2014/0272659 | A1 | 9/2014 | Lu et al. |
| 2015/0000523 | A1 | 1/2015 | Jojic et al. |
| 2015/0132214 | A1 * | 5/2015 | Eickhoff .............. B01J 7/02 423/657 |
| 2015/0217153 | A1 | 8/2015 | Jones |
| 2015/0344146 | A1 | 12/2015 | Theodore et al. |
| 2015/0349356 | A1 | 12/2015 | Ribarov et al. |
| 2015/0353201 | A1 | 12/2015 | Hagh et al. |
| 2016/0030781 | A1 | 2/2016 | Hoffjann et al. |
| 2016/0052639 | A1 * | 2/2016 | Burnell ............... B64D 37/32 95/46 |
| 2016/0064751 | A1 | 3/2016 | Hoffjann et al. |
| 2016/0102032 | A1 * | 4/2016 | Du ..................... B01J 8/1836 585/323 |
| 2016/0102261 | A1 | 4/2016 | Lam et al. |
| 2016/0167802 | A1 | 6/2016 | Lo et al. |
| 2016/0176535 | A1 | 6/2016 | Family et al. |
| 2016/0257419 | A1 | 9/2016 | Artaud et al. |
| 2016/0361684 | A1 | 12/2016 | Ranjan et al. |
| 2017/0122275 | A1 * | 5/2017 | Ishimitsu ........... F02M 37/223 |
| 2017/0145969 | A1 * | 5/2017 | Ishimitsu ........... F02M 37/22 |
| 2017/0167036 | A1 | 6/2017 | Tew et al. |
| 2017/0331131 | A1 | 11/2017 | Rheaume |
| 2017/0341019 | A1 | 11/2017 | Rheaume |
| 2018/0016025 | A1 | 1/2018 | Rheaume et al. |

FOREIGN PATENT DOCUMENTS

| | | |
|---|---|---|
| DE | 102013100803 A1 | 7/2014 |
| EP | 3023518 A1 | 5/2016 |
| GB | 1395691 | 5/1975 |
| JP | 2004022487 A | 1/2004 |
| WO | 9635634 A1 | 11/1996 |
| WO | 2011117610 A1 | 9/2011 |

OTHER PUBLICATIONS

Cordatos, H., "On-Board Aircraft Reactive Inerting Dried Gas System," U.S. Appl. No. 15/348,287, filed Nov. 10, 2016, pp. 1-20.
Rheaume, J., et al., "Fuel Stabilization Chamber," U.S. Appl. No. 15/798,125, filed Oct. 30, 2017, pp. 1-27.
Rheaume, J., et al.., "Inert Gas Generation with Dehumidification", U.S. Appl. No. 15/639,587, filed Jun. 30, 2017.
Perry, et al., "Perrys-Chemical-Engineers-handbook" McGraw-Hill, 7th Ed., 1999, p. 22-64.

(56) References Cited

OTHER PUBLICATIONS

Search Report regarding related EP Application No. 17177967.1; dated Nov. 23, 2017; 8 pgs.
Woodford, et al., "Heat exchangers," pp. 1-7; Jan. 17, 2016; https://web.archive.org/web/20161030205435/http://www.explainthatstuff.com/how-heat-exchangers-work.html.
W. Balster, et al., "Effects of Temerature on Formation of Insolubles in Aviation Fuels," The American Society of Mechanical Engineers, Presented a tthe Internationa Gas Turbine and Aeroengine Congress & Exhibition, Orlando, FL-Jun. 2-Jun. 5, 1997, pgs. 1-6.

* cited by examiner

FUEL TANK SYSTEM AND METHOD

BACKGROUND

This disclosure relates to fuel tank systems, and in particular to fuel tank vapor management systems.

This disclosure relates to fuel tank systems, and in particular to fuel tank vapor management systems.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank gas space also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing air with a mixture of nitrogen and oxygen at target oxygen thresholds for avoiding explosion or combustion.

It is known in the art to equip aircraft with onboard inert gas generating systems, which supply nitrogen-enriched air to the gas space (i.e., ullage) within the fuel tank. The nitrogen-enriched air has a substantially reduced oxygen content that reduces or eliminates combustible conditions within the fuel tank. However, conventional fuel tank vapor management systems do not address egress of volatile fuel vapors from the fuel tank gas space or their impact on safety or environmental concerns, nor do they address ingress to the tank of potentially problematic gases such as water vapor.

BRIEF DESCRIPTION

According to some embodiments of this disclosure, a fuel tank system comprises a fuel tank and a first fluid flow path between a gas space in the fuel tank and outside of the fuel system. A gas separation membrane is disposed with a first side in communication with the first fluid flow path and a second side in communication with a second fluid flow path. A fluid control device is in communication with the second fluid flow path and is configured to provide fluid flow from the second fluid flow path to a liquid space in the fuel tank or to outside of the fuel system. A prime mover is disposed in communication with the second fluid flow path, and is configured to move fluid on the second fluid flow path from the second side of the separation membrane to the fuel tank liquid space or to outside of the fuel system.

In some embodiments of the disclosure, a method of managing fuel tank vapor comprises directing outgoing fuel tank vent gas from a gas space in the fuel tank to a gas separation membrane. Hydrocarbons are removed from the outgoing fuel tank vapor through the membrane and directing the removed hydrocarbons to a liquid space in the fuel tank. In coming vent gas to the fuel tank is also directed past the gas separation membrane and water is removed from the incoming vent gas through the membrane.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
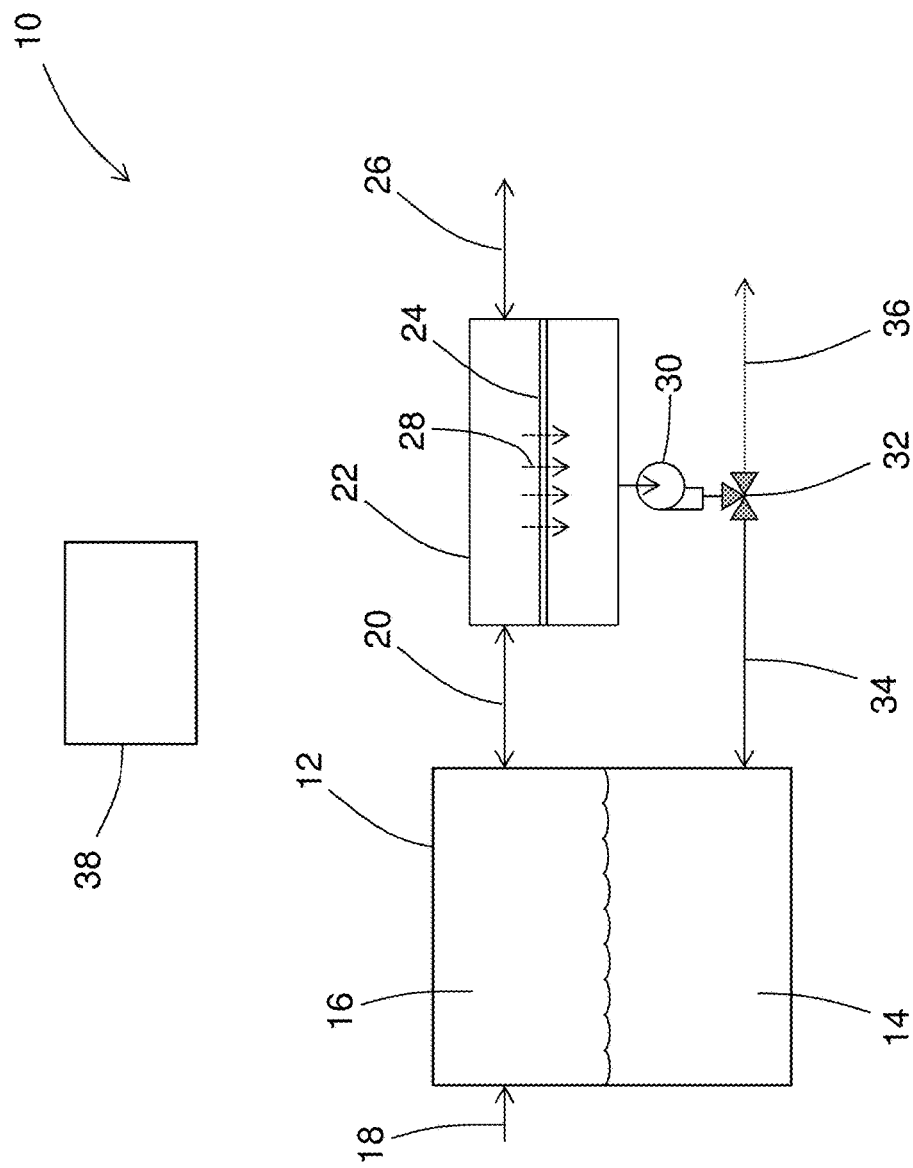
FIG. 1 is a schematic depiction of an example embodiment of a fuel tank system.

In some embodiments, the above-referenced fuel tank system can be disposed on-board a vehicle. The term "vehicle" includes any powered conveyance device, including but not limited to aircraft, marine vessels, railroad engines, or roadway motor vehicles. In some embodiments, the vehicle is an aircraft. In some embodiments, the vehicle is a marine vessel such as a marine vessel fueled by liquefied natural gas (LNG). Referring now to the Figures, in which the same numbering may be used in more than one Figure to represent the same feature without the necessity of explicit repetition in the description for each Figure, FIG. 1 schematically depicts a fuel tank system 10. In this description, a single separation membrane is shown for ease of illustration; however, the term "separation membrane" as used herein can include a plurality of separation membranes, which can be integrated into a single device or can be disposed at discrete locations along the first fluid flow path.

As shown in FIG. 1, an example embodiment fuel tank system 10 includes, of course, a fuel tank 12. Fuel tank 12 is depicted in FIG. 1 with a portion of its internal space occupied by liquid fuel, i.e., a liquid space 14. A portion of the internal space of the fuel tank 12 is occupied by a gas, i.e., a gas space 16 also sometimes referred to as "ullage". The gas can comprise various chemical compounds, including but not limited to components of air (e.g., nitrogen, oxygen) such as residual air from a tank filling process or vent air that entered the tank to fill space previously occupied by liquid fuel as the fuel is consumed, water vapor, hydrocarbon vapor resulting from evaporation of liquid fuel, as well as gases that may enter the gas space 16 for other purposes such as introducing an inert gas such as NEA to the gas space 16. The fuel tank systems disclosed herein can operate in conjunction with an inert gas system (not shown) that introduces an inert gas 18 to the fuel tank gas space 16, or in conjunction with other ullage passivation or inerting systems such as catalytic reaction with ullage fuel vapors or thermal condensation of ullage fuel vapors.

As further shown in the example embodiment of FIG. 1, a first fluid flow path is provided by a vent line 20 that is in fluid communication with a gas separation module 22 that comprises a gas separation membrane 24. The first fluid flow path continues along a first side of the membrane 24 to a vent line 26 that is in communication with a space outside of the fuel tank system (not shown, e.g., an outdoor space or a space outside of a vehicle). As described in further detail below, gas 28 can be selectively transported across the gas separation membrane 24 to a second fluid flow path disposed on a second side of the membrane 24. Fluid (e.g., permeate gas) flow along the second fluid flow path is driven by a prime mover 30 between the second side of the membrane 24 and a fluid control device depicted in the example embodiment of FIG. 1 as a three-way valve 32. The prime mover can be any device that converts or captures mechanical energy to drive fluid flow along the second fluid flow path, including but not limited to fans, blowers, compressors, vacuum pumps (e.g., electrically, mechanically, hydraulically, or pneumatically powered). An ejector could also be used to lower the pressure on the second side of separation membrane 24 in order to drive gas separation. The ejector could be powered by bleed air from a compressor section of a turbocompressor of a propulsion engine, or a mechanically driven compressor as is common with an APU (auxiliary power unit)), or aircraft ram inlet air. The prime mover can be dedicated to the fuel tank system or it can provide multiple functions. Similarly, a three-way valve is a part of an example embodiment, and other fluid control devices and schemes can be used, such as combination of two-way valves or other flow control devices, which can be assisted in their flow control operation by synchronization of prime mover operation, etc. With continued reference to FIG. 1, the three-way valve 32 can provide fluid communication with the fuel tank liquid space 14 through conduit 34, or to outside of the fuel tank system through conduit 36.

In some embodiments, a controller 38 can be in operative communication with the electrochemical cell, the membrane gas separator, and any associated valves, pumps, compressors, conduits, or other fluid flow components, and with switches, inverters, regulators, sensors, and other electrical system components, and any other system components to selectively operate the inert gas system. These control connections can be through wired electrical signal connections (not shown) or through wireless connections. In some embodiments, the controller 38 can be configured to operate the system according to specified parameters, as discussed in greater detail further below.

Figure 2A:
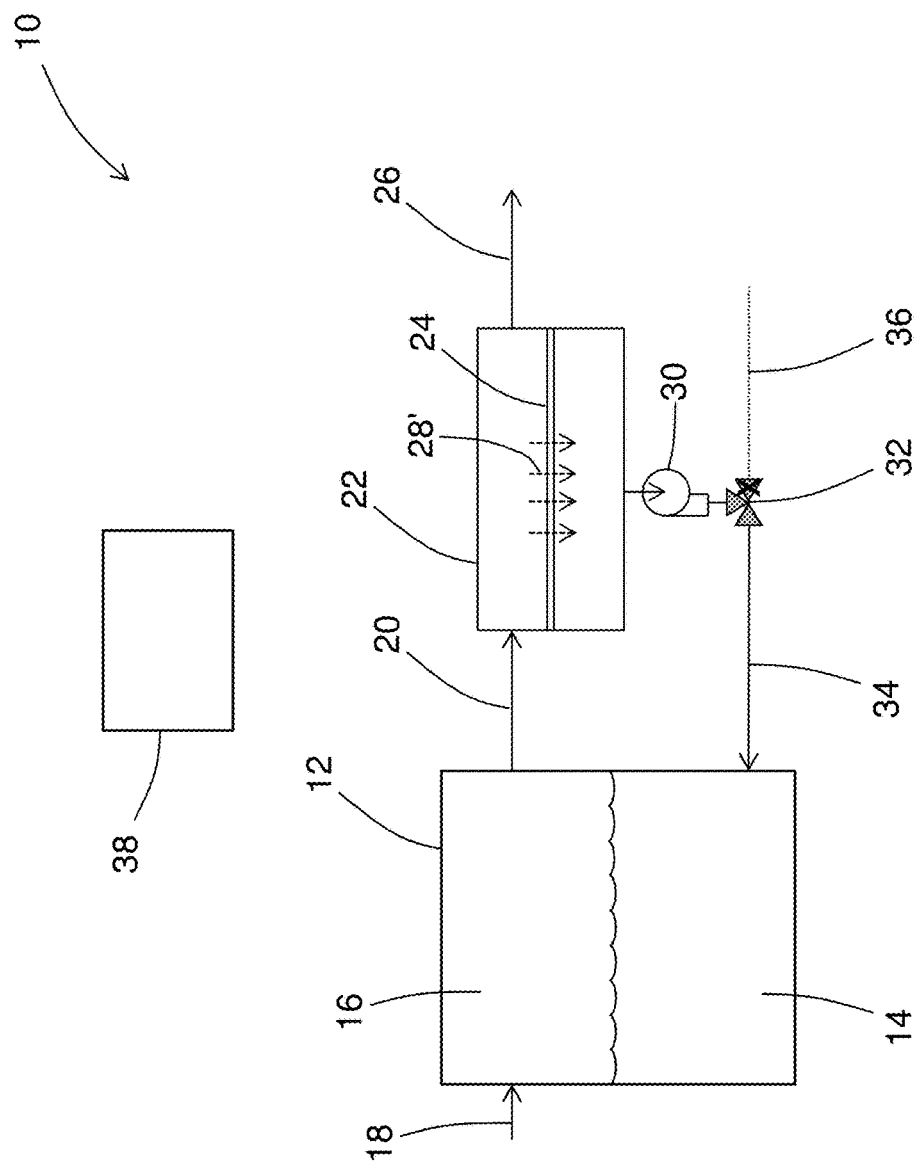
FIGS. 2A and 2B are each a schematic depiction of the system of FIG. 1 in different operational states.
Figure 2B:
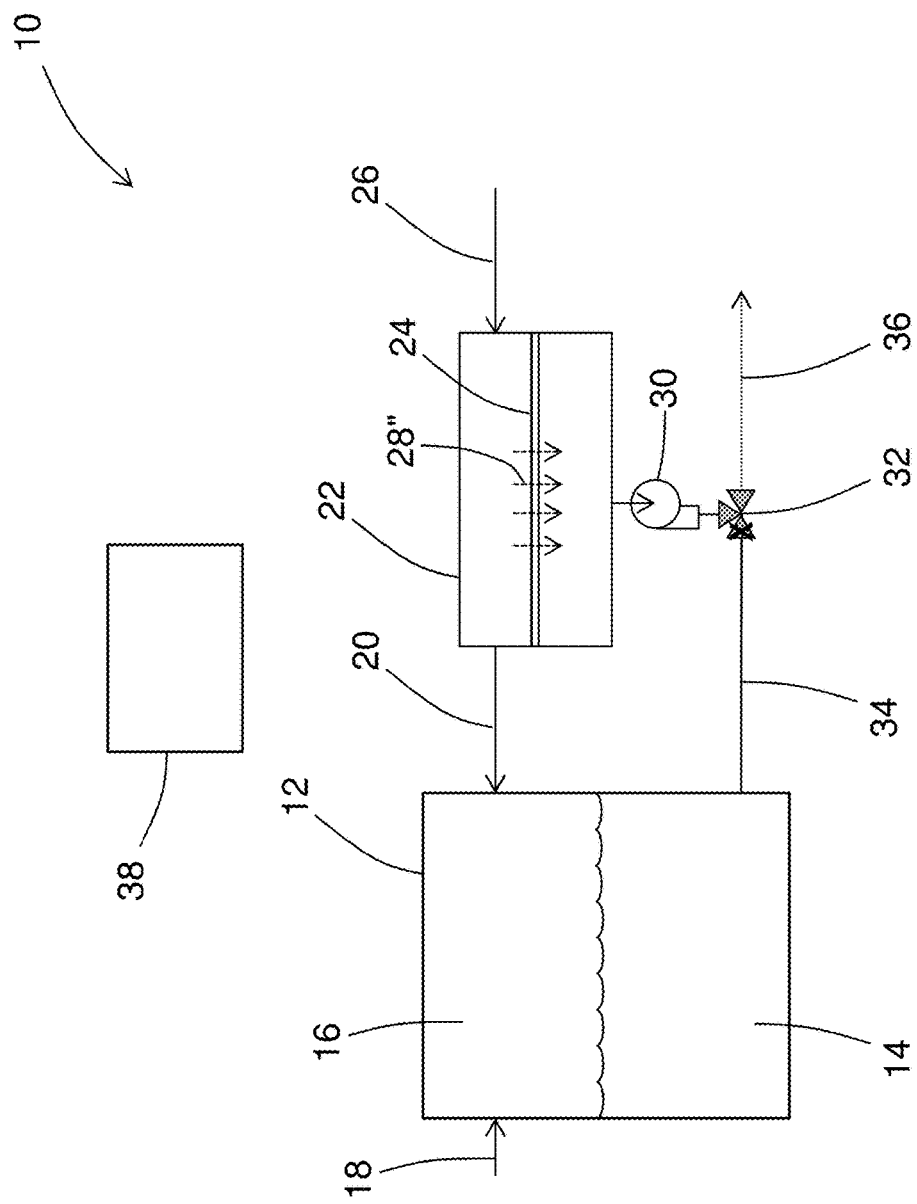

During operation, the system 10 can operate in different modes. An example embodiment of a first and second mode of operation is schematically depicted in FIGS. 2A and 2B. In a first example mode of operation, gas from fuel tank gas space 16 is venting out through vent line 20 in the direction indicated by the arrow. Venting out from the fuel tank can be caused by various factors, including but not limited to displacement of gas from the fuel tank gas space 16 by inert gas 18, displacement of gas from the fuel tank gas space by liquid fuel during tank filling, thermal expansion of gases in the fuel tank gas space 16, or a reduction in pressure outside of the tank (e.g., on an aircraft during ascent). The gas from the fuel tank gas space 16 can contain hydrocarbon vapors 28', which are selectively transported across the membrane 24 to the second fluid flow path and three-way valve 32. In this first mode of operation as shown in FIG. 2A, controller 38 sets the position of three-way valve 32 to be closed at the "X" and to direct the hydrocarbon vapors to the fuel tank liquid space 14 through conduit 34. In the fuel tank liquid space 14, the hydrocarbon vapors can condense to liquid fuel as heat from the hydrocarbon vapors is absorbed by the thermal mass of the liquid fuel in the tank.

In a second mode of operation, gas from outside of the fuel tank system (e.g., air) is venting into the fuel tank along the first fluid flow path through vent lines 26 and 20 in the direction indicated by the arrows. Venting into the fuel tank can be caused by various factors, including but not limited to displacement of liquid in the fuel tank liquid space 14 by outside gas as fuel is consumed, thermal contraction of gases in the fuel tank gas space 16, or an increase in pressure outside of the tank (e.g., on an aircraft during descent). The gas from outside of the fuel tank system 10 (e.g., outside air) can contain water vapor 28", which is selectively transported across the membrane 24 to the second fluid flow path and three-way valve 32. In this second mode of operation as shown in FIG. 2B, controller 38 sets the position of three-way valve 32 to be closed at the "X" and to direct the water to outside the fuel tank system through conduit 36. The water can simply be exhausted to the outside environment or can be used for other purposes (e.g., system process such as using water vapor as a process fluid or condensing to liquid water and spraying on a heat exchanger to provide latent heat absorption).

As disclosed above, the membrane 24, in different modes of operation, selectively transports hydrocarbon vapors or water. Various materials and configurations can be utilized for the gas separation membrane. Gas separation membranes can rely on one or more physical phenomena for selectivity in transportation of gases across the membrane. In some embodiments, a selective membrane can rely on size-selective pathways through the membrane that selectively allows transport of smaller molecules over larger molecules. Examples of such membranes include membranes that selectively allow transport of smaller water molecules over larger nitrogen molecules in air. Such membranes typically rely on molecule size-selective tortuous paths through a polymer matrix or through a porous metal or porous ceramic or other oxide to provide selectivity. So-called reverse selective membranes rely on phenomena including the solubility of the gas molecules in the membrane material to promote selectivity for more highly soluble molecules over less soluble molecules. Examples of such membranes include membranes that provide solubility for polar water molecules to promote selectivity for water molecules over non-polar oxygen or nitrogen molecules, or organic polymer membranes that provide solubility for organic fuel vapor molecules to promote selectivity for organic hydrocarbon molecules over inorganic oxygen or nitrogen molecules. Solubility factors can be used to promote selectivity for types of molecules regardless of size, i.e., solubility can be used to promote selectivity for larger molecules over smaller molecules or for smaller molecules over larger molecules. Selective materials for hydrocarbons include polyisoprene and other rubbery polymers. Selective materials for water include polyimides known for use in dehydration applications or 2,2-bistrifluoromethyl-4,5-difluoro-1,3-dioxole/tetrafluoroethylene. Selective materials for both hydrocarbons and water include polymers having polar or hydrophilic groups. Examples of materials that can have selectivity for water and hydrocarbon vapors include silicone rubbers (polydimethyl siloxane, polyoctylmethyl siloxane), polyethers (e.g., a copolymer of poly(ethylene oxide) (PEO) and poly(butylene therephthalate) (PBT), poly(4-methyl-2-pentyne), poly-trimethyl-silyl-propyne (PTMSP). The gas selective membrane can include any of the above materials, alone or in combination with each other or other selective materials. Combinations of different materials can be integrated into a single membrane structure (e.g., in layers, or zones in the x-y plane of a membrane structure), or can be disposed in series or in parallel as separate membrane structures or modules.

Figure 3:
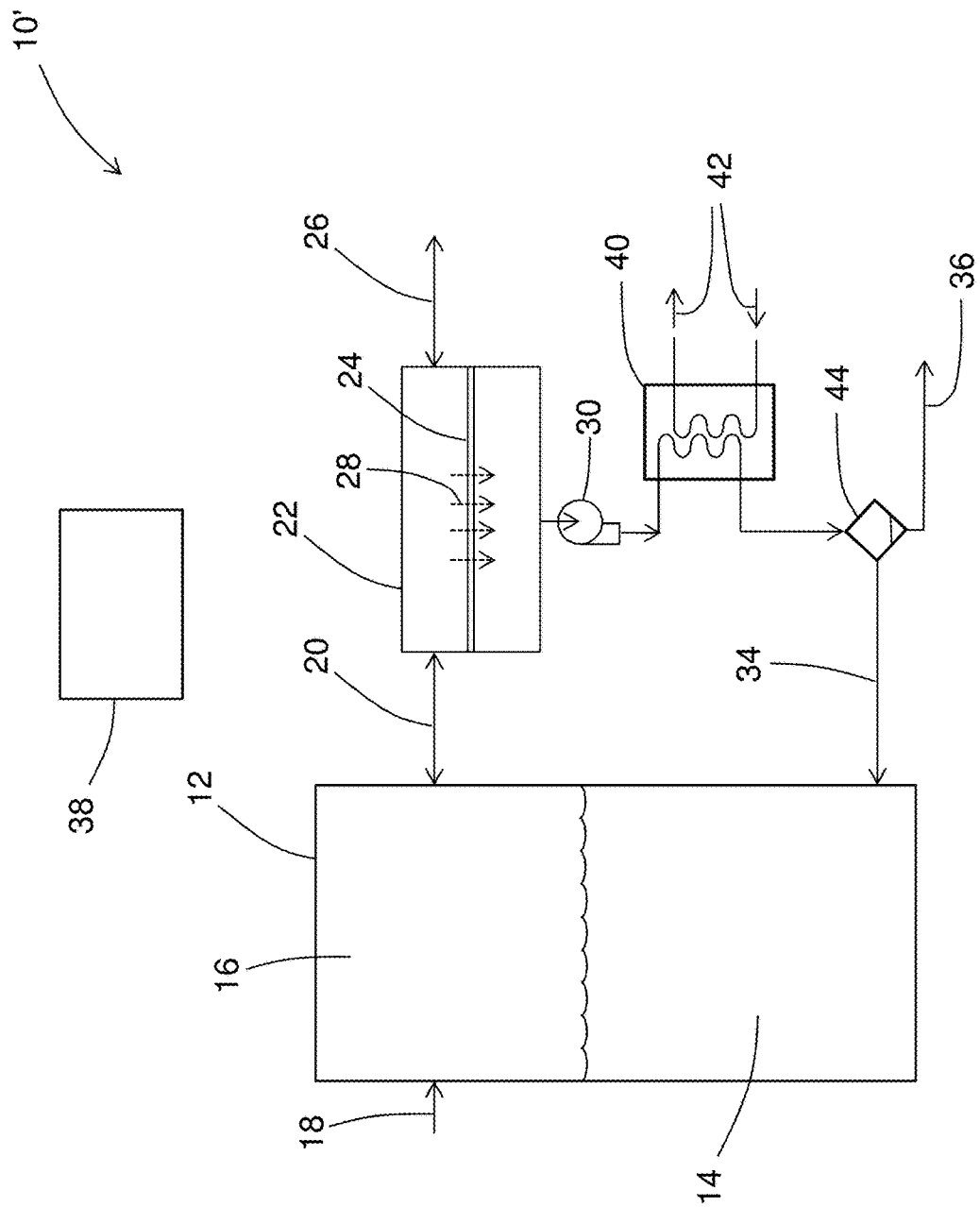
FIG. 3 is a schematic depiction of an example embodiment of a fuel tank system including a condensing heat exchanger.

In some embodiments, the system can include a heat exchanger condenser as depicted in FIG. 3. As shown in the example embodiment of FIG. 3, which repeats some numbering (and accompanying description from FIGS. 1-2), the details and description of which are therefore not repeated here. As shown in FIG. 3, a fuel tank system 10' includes the features of FIGS. 1-2, but includes a heat exchanger condenser 40, which absorbs heat from gas on the second fluid flow path into a cooling fluid 42, condensing hydrocarbon vapor and water, which is directed to a liquid separator 44. Any fuel from the liquid separator 44 is directed to fuel tank liquid space 14 through conduit 34, and any water from liquid separator 44 is directed outside of the fuel tank system through conduit 36. The example embodiment of FIG. 3 avoids the necessity of the three-way valve and accompanying control scheme of FIGS. 1-2 because of the readily-achieved physical separation between the polar liquid water and non-polar fuel in the liquid separator 44. In the above embodiments of FIGS. 1-3, check valves (not shown) can be included in the conduits 34, 36 to prevent unwanted flow against the direction shown by the arrows in the Figures.

Figure 4:
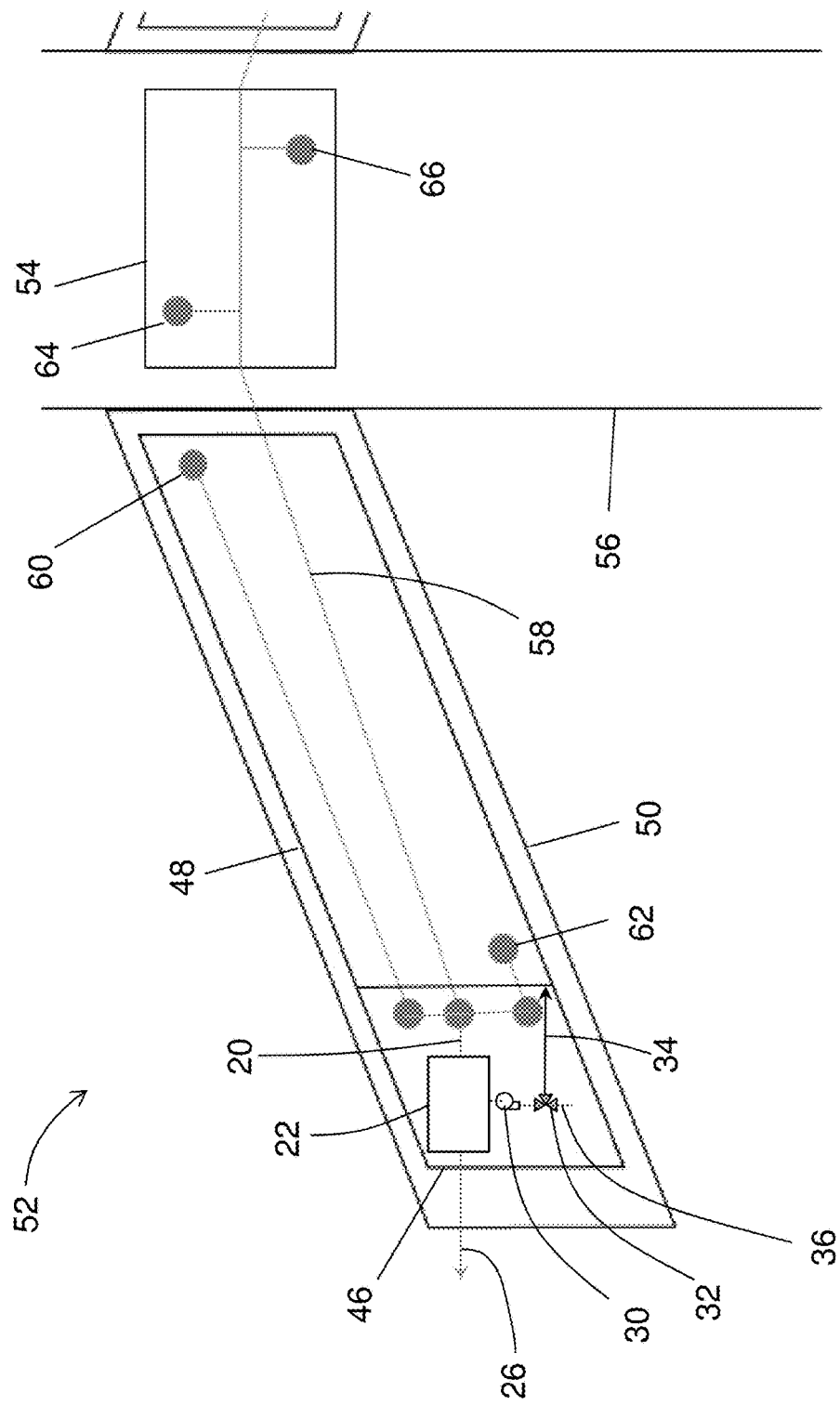
FIG. 4 is a schematic depiction of an example embodiment of a fuel tank system disposed on an aircraft.
Figure 5:
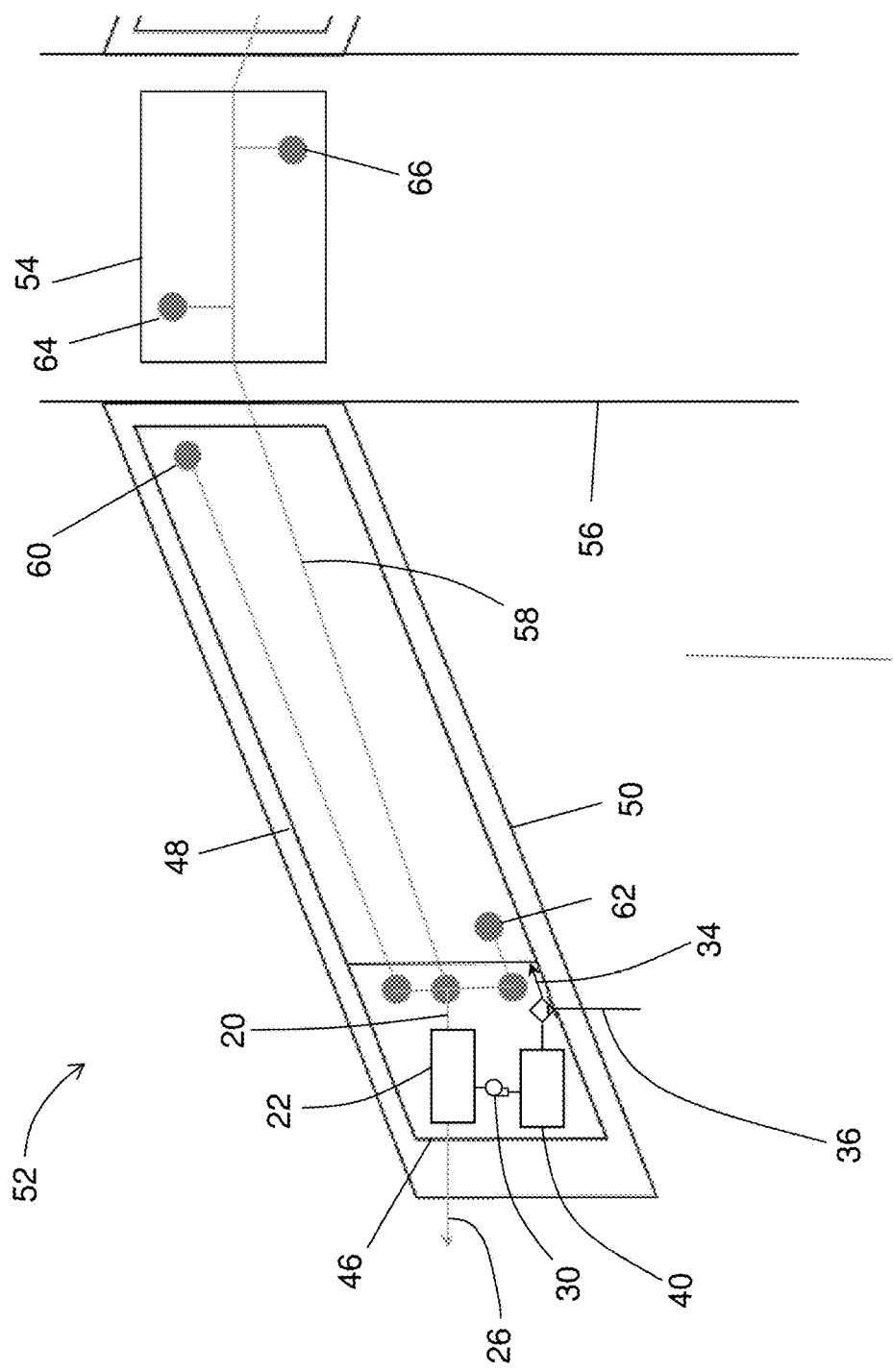
FIG. 5 is a schematic depiction of an example embodiment of fuel tank system including a condensing heat exchanger disposed on an aircraft.

As mentioned above, the fuel tank systems disclosed herein can be utilized on vehicles such as aircraft, where fuel tank vapor management can be a challenge because of widely varying outside pressure, temperature, and weather conditions on the ground and at various altitudes. Example embodiments of fuel tank systems on board an aircraft are schematically depicted in FIGS. 4-5. As shown in FIGS. 4-5, system components as numbered and described for FIGS. 1-3 are disposed in a left wing vent box 46 disposed along with wing fuel tank 48 in a wing 50 of an aircraft 52. The aircraft 52, depicted in a partial view in FIGS. 4-5 also includes a center tank 54 disposed in fuselage 56, and also a right wing and tank and vent box (not shown), with the fuel tanks sharing a common vent system 58 that includes left wing climb vent 60, a left wing dive vent 62, center tank climb vent 64, center tank dive vent 66, and other unnumbered vents depicted by the same circular shapes as the numbered vents. As shown in FIGS. 4-5, the fuel tank system can be integrated with a tank ventilation system, and in a location where many aircraft designs provide under-utilized space. Accordingly, the system can be readily retrofit onto an existing aircraft or can be installed as new OEM equipment.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A fuel system, comprising:
    a fuel tank including a gas space in the fuel tank and a liquid space in the fuel tank;
    a first fluid flow path between the gas space in the fuel tank and outside of the fuel system;
    a gas separation membrane comprising a first side in communication with the first fluid flow path and a second side, wherein the gas separation membrane has a greater permeability to water vapor and hydrocarbon vapor than to oxygen or nitrogen;
    a second fluid flow path in communication with the second side of the membrane;
    a fluid control device in fluid communication with the second fluid flow path, with the liquid space in the fuel tank and with outside of the fuel system, said fluid control device configured to provide fluid flow from the second fluid flow path to a destination selected from the liquid space in the fuel tank and the outside of the fuel system; and
    a prime mover in communication with the second fluid flow path, configured to move fluid on the second fluid flow path from the second side of the separation membrane to the fuel tank liquid space or to outside of the fuel system.

2. The system of claim 1, wherein the membrane comprises a first material having a greater permeability to water vapor than to oxygen or nitrogen, and a second material having a greater permeability to hydrocarbon vapor than to oxygen or nitrogen.

3. The fuel system of claim 1, comprising a first membrane having a greater permeability to water vapor than to oxygen or nitrogen, and a second membrane having a greater permeability to hydrocarbon vapor than to oxygen or nitrogen.

4. The fuel system of claim 1, wherein the membrane comprises a material having a greater permeability to water vapor than to oxygen or nitrogen and a greater permeability to hydrocarbon vapor than to oxygen or nitrogen.

5. The fuel system of claim 1, wherein the fluid control device comprises a three-way valve or a combination of two-way valves.

6. The fuel system of claim 1, wherein the fluid control device comprises a water-hydrocarbon separator comprising an inlet in communication with the second fluid flow path, a hydrocarbon outlet in communication with the liquid space in the fuel tank, and a water outlet in communication with outside of the fuel system.

7. The fuel system of claim 1, further comprising a vapor-condensing heat exchanger disposed along the second fluid flow path.

8. The fuel system of claim 7, wherein the fluid control device comprises a water-hydrocarbon separator comprising an inlet in communication with the second fluid flow path, a hydrocarbon outlet in communication with the liquid space in the fuel tank, and a water outlet in communication with outside of the fuel system.

9. The fuel system of claim 1, wherein the system is configured for fluid flow from the second fluid flow path to the liquid space of the fuel tank if fluid is moving on the first fluid flow path from the fuel tank gas space to outside of the fuel system, and for fluid flow from second fluid flow path to outside of the fuel system if fluid is moving on the first fluid flow path from outside of the fuel system to the fuel tank gas space.

10. The fuel system of claim 1, wherein the fuel system is disposed on an aircraft, and is configured for fluid flow from the second fluid flow path to the liquid space of the fuel tank during ascent, and for fluid flow from second fluid flow path to outside of the fuel system during descent.

11. The fuel system of claim 1, wherein the fuel system is disposed on an aircraft in a wing vent box.

12. The fuel system of claim 1, further comprising a controller configured to controllably direct fluid flow from the second fluid flow path to the liquid space of the fuel tank or to outside of the fuel system.

13. The fuel system of claim 12, wherein the controller is configured to direct fluid flow from the second fluid flow path to the liquid space of the fuel tank if fluid is moving on the first fluid flow path from the fuel tank gas space to outside of the fuel system, and to direct fluid flow from second fluid flow path to outside of the fuel system if fluid is moving on the first fluid flow path from outside of the fuel system to the fuel tank gas space.

14. The fuel system of claim 12, wherein the fuel system is disposed on an aircraft, and the controller is configured to direct fluid flow from the second fluid flow path to the liquid space of the fuel tank during ascent, and to direct fluid flow from second fluid flow path to outside of the fuel system during descent.

15. A method of managing fuel tank vapor, comprising
directing outgoing fuel tank vent gas from a gas space in the fuel tank to a gas separation membrane;
removing hydrocarbons from the outgoing fuel tank vapor through the membrane and directing the removed hydrocarbons to a liquid space in the fuel tank; and
directing incoming vent gas to the fuel tank past the gas separation membrane; and removing water vapor from the incoming vent gas through the membrane.

16. The method of claim 15, further comprising condensing the removed water or hydrocarbons.

17. The method of claim 16, further comprising separating liquid water from liquid hydrocarbons in the condensate.

18. The method of claim 15, wherein the fuel tank is disposed on an aircraft, and the method comprises removing hydrocarbons from outgoing fuel tank vapor through the membrane and directing the removed hydrocarbons to a liquid space in the fuel tank during ascent, and removing water from incoming vent gas through the membrane during descent.

* * * * *